United States Patent [19]

Roth et al.

[11] Patent Number: 5,468,276
[45] Date of Patent: Nov. 21, 1995

[54] FERTILIZER CHIP AND PROCESS FOR MAKING SAME

[75] Inventors: Timothy J. Roth, Allentown, Pa.; William R. Welliver, Ship Bottom, N.J.

[73] Assignee: Air Products and Chemicals, Inc., Allentown, Pa.

[21] Appl. No.: 247,916

[22] Filed: May 23, 1994

[51] Int. Cl.⁶ ............................ C05F 3/00; C05G 5/00
[52] U.S. Cl. .................. 71/15; 71/21; 71/25; 71/64.04; 47/9; 241/19
[58] Field of Search .................. 71/64.04, 9, 11, 71/15, 21, 24, 25; 47/9; 241/19

[56] References Cited

U.S. PATENT DOCUMENTS

| | | | |
|---|---|---|---|
| 17,237 | 5/1857 | Stearns | 71/13 |
| 19,974 | 4/1858 | Spieker | 71/62 |
| 144,877 | 11/1873 | Stevens | 71/15 |
| 242,777 | 6/1881 | Huet | 71/15 |
| 4,248,601 | 2/1981 | McGough et al. | 71/64.04 |
| 4,752,316 | 6/1988 | Plovanick et al. | 71/9 |

FOREIGN PATENT DOCUMENTS 4104736  4/1992  Japan .................. 47/59 CO

Primary Examiner—Ferris Lander
Attorney, Agent, or Firm—Russell L. Brewer; William F. Marsh

[57] ABSTRACT

This invention pertains to a fertilizer and a process for producing the same which incorporates flyash, which is a by-product from the coal fired utility industry, with an organic fertilizing component comprising manure. The flyash and manure are mixed with the resulting mixture compressed by passing the mixture through a roller press thereby forming a sheet and then fracturing the sheet into chips or other particulate form. The water content of the mixture is controlled in an effort to produce particulates having high dry strength.

6 Claims, No Drawings

FERTILIZER CHIP AND PROCESS FOR MAKING SAME

FIELD OF THE INVENTION

This invention relates to agricultural fertilizers In chip form and to a process for producing such fertilizers.

BACKGROUND OF THE INVENTION

The use of various inorganic and organic components which are rich in phosphorus, potassium and nitrogen as agricultural fertilizers is well known. Often these components or materials are combined with a binder and pelletized to facilitate handling, storage and application to agricultural fields.

It has been common practice in the manufacture of fertilizer compositions to incorporate materials which are by-products from various processes as a way of converting materials of little commercial value into fertilizer compositions. Such utilization of by-products not only solves a disposal problem associated with such by-products, but converts these generally low value products into products of value. Often there are associated difficulties in such conversions in that products are not storage stable, are difficult to handle, or may not be applied to the crops with conventional equipment.

With respect to the agricultural fertilizer of the present invention, the following patents have relevancy to the extent that they deal with many of the components comprised in the agricultural fertilizer. These patents include the following:

U.S. Pat. No. 242,777 discloses a process for preserving and disinfecting animal and vegetable substances derived from rendering establishments, sewers, manure, etc. while at the same time converting the manure and animal substances into fertilizers which are effective as stimulus to the growth of vegetation and which are effective as active insecticides. The process contemplates forming a solution or magma of lava rich in potash by contacting a lava containing silica, alumina, lime, iron, magnesium and a small phosphorus with sulfuric acid or hydrochloric acid. The solution is filtered and the solid residue remaining is removed therefrom. The solution then is mixed with fecal matter at a maximum of 5 kg filtrate per kg of fecal matter and then mixed with empyreumatic lime. This material is mixed and then dried for conversion into a fertilizer.

U.S. Pat. No. 19,974 discloses a process for condensing and fixing ammonia in fertilizers for use in the soil. In that process, an aluminous earth consisting of various silicates of alumina mixed with other silicates; e.g., silicate of potash, sodium or silicate of iron, is powdered and made into a porous bed having access to the free action of air.

U.S. Pat. No. 144,877 discloses methods for producing fertilizers from the carcasses of tallow-rendering animals. A supernatant liquid obtained from a tallow-rendering vat is withdrawn from the vat and the water evaporated therefrom to produce a solution. This liquid then is mixed with Plaster of Paris for the purpose of combining with the remaining moisture in the syrupy residue. When allowed to dry, the mixture of Plaster of Paris and tallow residue is converted into a friable mass which then can be ground to a fine powder for fertilizer application. Dried clay, chalk and marl are suggested as possible replacement candidates for the Plaster of Paris.

U.S. Pat. No. 17,237 discloses a process for preparing green-sand-marl fertilizers. The marl is washed to separate a large amount of alumina and useless earthy components, leaving the green-sand which then is dried, pulverized and disintegrated. The green-sand then is mixed with about 600 lbs. of night soil per 1000 lbs. of green-sand and 100 lbs. of sulfate of lime.

SUMMARY OF THE INVENTION

This invention pertains to a fertilizer and a process for producing the same which incorporates flyash, which is a by-product from the coal fired utility industry, with an organic fertilizing component comprising manure. The flyash and manure are mixed with the resulting mixture compressed into a sheet and then the resulting sheet fractured into chips.

The invention has significant advantages and these include:

the development of an agricultural fertilizer having excellent storage stability and handling characteristics;

the utilization of a by-product of the coal-fired electric power industry into a useful product;

an ability to formulate an agricultural fertilizer in "chip" form which has excellent strength in dry condition, but is readily friable under moist conditions allowing for dispersion into the soil and utilization of the nutrients contained therein by crops;

a process which is simple to perform in non sophisticated equipment.

DETAILED DESCRIPTION OF THE INVENTION

The agricultural fertilizer contemplated here comprises flyash as one of the components. Flyash is generated in coal-fired power plants, primarily where the coal is combusted in finely divided form and the flyash precipitated from the flue gases. The particle size of such flyash is generally between about 100 to 325 mesh U.S. standard sieve. Flyash is predominantly silica and alumina with large amounts of iron oxides. As might be expected from a silica containing product, flyash is somewhat glassy in appearance because of the high temperatures reached in the combustion process.

The other primary component of the agricultural fertilizer is manure, and that term requires little description. Virtually any manure may be used for combination with the flyash, although it is preferred that the manure be essentially free of extraneous fibrous material such as straw, chaff, and the like. Manure from chickens, sheep and other ruminants is desirable for preparing the agricultural fertilizer.

Other additives conventionally used in fertilizers may be incorporated into the agricultural fertilizer, and these include nitrogen, phosphorus, potash providing components, as well as insecticides and specialty herbicides. Examples of fertilizer components include ammonium nitrate, ammonium phosphate, ammonium sulfate, pH adjustment additives such as calcium carbonate, etc. Insecticides include thiocarbamates, an example being sold under the trademark, Sevin; chlorinated organics, and diazinone. Virtually any of the specialty herbicides may be combined with the fertilizer batch in amounts as desired.

In formulating the fertilizer, a master formulation is prepared by mixing the flyash with the manure and other preselected fertilizer components thereby creating a blend. The liquid, primarily water, concentration of the blend should be controlled such that from about 5% to 28% by weight of the batch is liquid or water. Such liquid or water content will leave the resulting blend in the form of a thick paste having a consistency similar to peanut butter. If too much water is present in the resulting blend, problems are associated with the sheet-forming step with residual water being squeezed from the resulting mixture during pressing and sheet forming. Too little water results in a paste having insufficient binding attraction for enhanced sheet formation.

In the processing of the blend to form a storage-stable, high strength chip, which is easily handled during storage and easily handled for application to crops, the blend is formed into a sheet and the resulting sheet fractured into small chips. One method of sheet formation is accomplished by passing the blend through a roll press under a compression load of from 4 to 20 tons force per linear inch of sheet width. Typically a roll speed of 1 to 10 linear feet per second is made during compaction, thus providing a residence time of from about 0.1 to 0.5 seconds. Generally, the roll faces are maintained at elevated temperature; e.g., from 25° C. to 135° C. High temperature generally ought to be avoided since the high temperature also results in the liberation of ammonia from the blend, thereby decreasing its nitrogen imparting characteristics. To facilitate compaction and compression in the roll press, the blend may be conveyed to the roll press via a screw-type conveyor which delivers the blend in relatively compact form to the compression rolls. As the blend of flyash and manure, optionally including other fertilizer components, is fed to the compression roll, the blend is formed into a thin sheet; e.g., from about 0.08 to 0.54 inches in thickness. Because of the high compression pressures, the manure and flyash bond through physical attraction for providing chip form product having excellent dry strength.

The sheet can be fractured into chip utilizing a wide variety of mechanical apparatus or chips can be ground or fractured allowing the sheet from the compression rolls to fall onto a conveyor, with the falling onto the belt causing the sheet to fracture. Supplemental crushing can be conducted, if required. The resulting chips have a size of from about ¼ to 1 inch on a side when dried and have excellent strength for promoting storage stability and handling.

The following examples are provided to illustrate various embodiments of the invention and are not intended to restrict the scope thereof.

EXAMPLE 1

Trial Procedure for producing Chip Form Fertilizer

A series of tests were carried out in order to produce "chip" form agricultural fertilizers from flyash and a straw free cow manure. The roll press used in the process was a Komarek lab compactor; a granulating unit having a ⅜" open screen was also used.

In general a blend was prepared by mixing a flyash with manure with the weight percent of flyash being about 70% and the manure being about 30% These materials were blended in a Beardsley and Piper Speed Mullor Mixer, Model 45B having an 18-inch drive with 10-inch straight side with a scraper and muller operating at 400 rpm. The blend was densified via a densifying screw press and then introduced to a variable speed vertical double roll compactor, said compactor having smooth roll surfaces. The rolls were 2 inches wide and had a 5 inch diameter. The roll separating force ranged from about 4 to 9 tons per linear inch of roll face with the roll speed ranging from 6 to 11 rpm. The temperature of the roller face approached 135° F. causing an evolution of ammonia and urea. A sheet having a thickness of about 0.25 inches was generated and was comminuted into chip form product using a Model DAS 06 Knife Comminutor. The chips were about ⅛ inch in thickness and had irregular planar dimensions of about ½ to 1 inch. The chips then were ground in the comminutor to produce a product having a mesh size of 4 to 30 US mesh.

More specifically, the feed was prepared in an amount of 280 lbs flyash and 120 lbs of cow manure. The manure was placed in the mixer and initially mixed for 5 min. After that, the fly ash was added and mixing was continued for an additional 5 min. Then water in preselected amounts was added and the blend mixed for an additional 10 min. The blend was the compacted and processed as described above. Table 1 below set forth the general processing conditions and results.

TABLE 1

| Run | Flyash % | Manure % | Moisture % | Blend Density g/cc | Roll Speed RPM | Sheet Thickness mm | Roll Force MN/m | Description of Chips |
| --- | --- | --- | --- | --- | --- | --- | --- | --- |
| 1 | 70 | 30 | 14.1 | 0.89 | 6 | 3.5 | 1.39 | Strong, stable |
| 2 | 50 | 50 | 14.1 | 0.94 | 10.8 | 1.3 | 1.39 | Weak, friable |
| 3 | 80 | 20 | 15.1 | 0.8 | 10.8 | 2.9 | 1.39 | Medium strong, easily broken |
| 4 | 100 | — | 5.0 | 0.68 | 6 | 2.7 | 1.39 | Poor chips |
| 5 | 80 | CaSO₄ | 9.4 | 0.6 | 6 | 2.9 | 1.39 | Strong, stable |
| 6 | 100 | | 12.0 | 0.87 | 6 | 3.3 | 1.39 | Poor strength |
| 7 | 100 | 6 Brewex* | 7.2 | 0.64 | 6 | 2.9 | 1.39 | Medium strong |
| 8 | 100 | 9 Brewex | 10.1 | 0.8 | 8.2 | 2.9 | 1.39 | Very strong and stable |
| 9 | 70 | 30 | 25.8 | 0.87 | 0.87 | 2.9 | 1.39 | Strong and stable |

*Brewex is a trademark for a modified starch containing 47% malto dextrins, 33% maltose, 10% glucose, 6% protein and 4% ash.

What is claimed is:

1. In a process for producing a particulate agricultural fertilizer, the improvement which comprises:

a) mixing flyash and a manure in a weight ratio of from 2.3 to 4.0 weight parts flyash per weight part manure thereby forming a blend;

b) adjusting the moisture content of the blend to a level of from about 5% to 28% by weight thereby forming a moist blend;

c) compacting the moist blend in a compaction zone comprising a roller press under a pressure of from 4 tons force to 20 tons force per linear inch of roller width and thereby converting the moist blend into a sheet having a thickness of from 0.08 to 0.54 inches;

d) maintaining the sheet under compaction for a period of from 0.1 to 0.5 seconds; and, e) fracturing the sheet into particulate material.

2. The process of claim 1 wherein compaction in said compaction zone is provided in a double roll press.

3. The process of claim 2 wherein the double roll press comprises two rollers and the rollers have a diameter of from 0.4 to 2.0 feet.

4. The process of claim 3 wherein both rollers are rotated at a rate to provide a linear surface speed of from 0.5 to 2.5 feet per second.

5. The process of claim 4 wherein a temperature of 25° C. to 120° C. is maintained during the compaction of the moist blend.

6. The process of claim 1 wherein the particulate material is comminuted and screened producing granulated product having a particle size of 4 to 30 US mesh.

* * * * *